United States Patent
Vaudenay et al.

(10) Patent No.: US 9,930,523 B2
(45) Date of Patent: Mar. 27, 2018

(54) METHOD AND DEVICE FOR PROVING HIS IDENTITY

(71) Applicant: Ecole Polytechnique Federale de Lausanne (EPFL), Lausanne (CH)

(72) Inventors: Serge Vaudenay, Crissier (CH); Ioana C. Carlson, Stanmore (GB)

(73) Assignee: Ecole Polytechnique Federale De Lausanne (EPFL) (CH)

( * ) Notice: Subject to any disclaimer, the term of this patent is extended or adjusted under 35 U.S.C. 154(b) by 79 days.

(21) Appl. No.: 14/643,473

(22) Filed: Mar. 10, 2015

(65) Prior Publication Data

US 2015/0264570 A1    Sep. 17, 2015

Related U.S. Application Data

(60) Provisional application No. 61/951,255, filed on Mar. 11, 2014.

(51) Int. Cl.
    *H04W 12/06* (2009.01)
    *H04L 29/06* (2006.01)
    (Continued)

(52) U.S. Cl.
    CPC .......... *H04W 12/06* (2013.01); *H04L 9/0872* (2013.01); *H04L 9/3271* (2013.01); *H04W 12/12* (2013.01);
    (Continued)

(58) Field of Classification Search
    CPC ...... H04W 12/00; H04W 12/04; H04W 12/06
    See application file for complete search history.

(56) References Cited

U.S. PATENT DOCUMENTS

| 2002/0080285 A1* | 6/2002 | Oshima | H03M 13/256 |
|---|---|---|---|
| | | | 348/724 |
| 2003/0120929 A1* | 6/2003 | Hoffstein | H04L 9/3247 |
| | | | 713/176 |

(Continued)

OTHER PUBLICATIONS

I. Boureanu et al., "Challenges in Distance Bounding", Trends in Cryptography, IEEE Computer and Reliability Societies, Jan./Feb. 2015, pp. 41-48.

(Continued)

*Primary Examiner* — Samson Lemma
*Assistant Examiner* — Arya Golriz
(74) *Attorney, Agent, or Firm* — Blank Rome LLP

(57) ABSTRACT

The invention is related to a method allowing a prover holding a secret key (x) to prove its identity to a verifier and to prove to this verifier that he is within a predetermined distance of this verifier, said method comprising an initialization phase during which:
the prover picks a first nonce ($N_p$) and communicates this first nonce to the verifier;
the verifier picks a first random vector (a), a leak function ($L_\mu$), and a second nonce ($N_v$);
the verifier uses said leak function ($L_\mu$) to compute a modified secret (x') depending on the leak ($L_\mu(x)$) of said secret;
the verifier transmits to said prover said leak function and said second nonce;
the prover retrieves said first random vector and said modified secret,
wherein said first random vector and said modified secret are used by said prover for computing responses ($r_i$) to challenges ($c_i$).

19 Claims, 6 Drawing Sheets

The DBopt Distance-Bounding Protocols

(51) Int. Cl.
    H04W 12/12    (2009.01)
    H04L 9/32     (2006.01)
    H04L 9/08     (2006.01)
    H04W 4/00     (2018.01)
(52) U.S. Cl.
    CPC ....... H04L 2209/805 (2013.01); H04W 4/008
                                                (2013.01)

(56) References Cited

U.S. PATENT DOCUMENTS

| | | | | |
|---|---|---|---|---|
| 2004/0123113 | A1* | 6/2004 | Mathiassen | B60R 25/252 713/185 |
| 2004/0207548 | A1* | 10/2004 | Kilbank | H03M 7/30 341/107 |
| 2006/0112273 | A1* | 5/2006 | Tuyls | H04L 9/321 713/171 |
| 2007/0150419 | A1* | 6/2007 | Kozlay | G06Q 20/12 705/67 |
| 2008/0046362 | A1* | 2/2008 | Easterly | G06Q 20/04 705/40 |
| 2010/0100947 | A1* | 4/2010 | Ciet | H04L 9/3271 726/6 |
| 2013/0102252 | A1* | 4/2013 | Rasmussen | H04K 1/04 455/41.2 |

OTHER PUBLICATIONS

G. Avoine, et al., "An Efficient Distance Bounding RFID Authentication Protocol: Balancing False-Acceptance Rate and Memory Requirement", Lecture Notes in ComputerScience 5735, pp. 250-261, Springer-Verlag, 2009.
J. Hermans, et al., "Efficient, Secure, Private Distance Bounding without Key Updates", ACM Conference on Security and Privacy in Wireless and Mobile Networks WISEC'13, Budapest, Hungary, pp. 195-206, ACM, 2013.
G. P. Hancke, et al., "An RFID Distance Bounding Protocol", Conference on Security and Privacy for Emerging Areas in Communications Networks SecureComm '05, Athens, Greece, pp. 67-73, IEEE, 2005.
Y. Desmedt, "Major Security Problems with the "Unforgeable" (Feige-) Fiat-Shamir Proofs of Identity and How to Overcome Them", Congress on Computer and Communication Security and Protection Securicom '88, Paris, France, pp. 147-159, DEDEP Paris France, 1988.
G. P. Hancke, "Distance-Bounding for RFID: Effectiveness of 'terrorist fraud' in the Presence of Bit Errors", IEEE 2012 International Conference on RFID—Technologies and Applications (RFID-TA), pp. 91-96.
S. Vaudenay, "On Modeling Terrorist Frauds—Addressing Collusion in Distance Bounding Protocols", Provable Security ProvSec '13, Melaka, Malaysia, Lecture Notes in Computer Science 8209, pp. 1-20, Springer-Verlag, 2013.
S. Vaudenay, "Private and Secure Public-Key Distance Bounding—Application to NFC Payment", International Financial Cryptography Association 2015, Lecture Notes in Computer Science 8975, pp. 207-216, 2015.
C. H. Kim, et al., "RFID Distance Bounding Protocol with Mixed Challenges to Prevent Relay Attacks", Cryptology and Network Security, 8th International Conference CANS 2009, Kanazawa, Japan, Lecture Notes in Computer Science 5888, pps. 119-133, Springer-Verlag, 2009.
S. Gambs, et al., "Prover Anonymous and Deniable Distance-Bounding Authentication", ACM Symposium on Information, Computer and Communications Security (ASIACCS '14), Kyoto, Japan, pp. 501-506, ACM Press, 2014.
I. Boureanu, et al., "Secure and Lighweight Distance-Bounding", Lightweight Cryptography for Security and Privacy LightSec '13, Gebze, Turkey, Lecture Notes in Computer Science 8162, pp. 97-113, Springer-Verlag, 2013.
C. H. Kim et al., "The Swiss-Knife RFID Distance Bounding Protocol", Information Security and Cryptology ICISC '08, Seoul, Korea, Lecture NOtes in Computer Science 5461, pp. 98-115, Springer-Verlag, 2009.
M. Fischlin, et al., "Terrorism in Distance Bounding: Modeling Terrorist-Fraud Resistance", Applied Cryptography and Network Security ACNS '13, Banff AB, Canada, Lecture Notes in Computer Science 7954, pp. 414-431, Springer-Verlag, 2013.
I. Boureanu, et al., "Towards Secure Distance Bounding", Fast Software Encryption '13, Singapore, Lecture Notes in Computer Science 8424, pp. 55-67, Springer-Verlag, 2013.
S. Brands, et al., "Distance-Bounding Protocols", Advances in Cryptology Eurocrypt '93, Lofthus, Norway, Lecture Notes in Computer Science 765, pp. 344-359, Springer-Verlag, 1994.
L. Bussard, et al., "Distance-Bounding Proof of Knowledge to Avoid Real-Time Attacks", International Conference on Information Security SEC '05, Chiba, Japan, pp. 223-238, Springer-Verlag, 1994.
S. Vaudenay, *"Proof of Proximity of Knowledge"*, IACR Eprint *2014/695 report*, 2014, 21 pages.
N. Chandran, et al "Position Based Cryptography", Advances in Cryptology Crypto '09, Santa Barbara, California, U.S.A., Lecture Notes in Computer Science 5677, pp. 391-407, Springer-Verlag, 2009.
C. Cremers, et al., "Distance Hijacking Attacks on Distance Bounding Protocols", IEEE Symposium on Security and Privacy S & P '12, San Francisco, California, U.S.A., pp. 113-127, IEEE Computer Society, 2012.
V. Nikov, et al., "Yet Another Secure Distance-Bounding Protocol", Proceedings of Secrypt '08, Porto, Portugal, INSTICC Press, 2008, 14 pages.
I. Boureanu et al., "Practical & Provably Secure Distance-Bounding", IACR Eprint 2013/465 report, 2013, 20 pages.

* cited by examiner

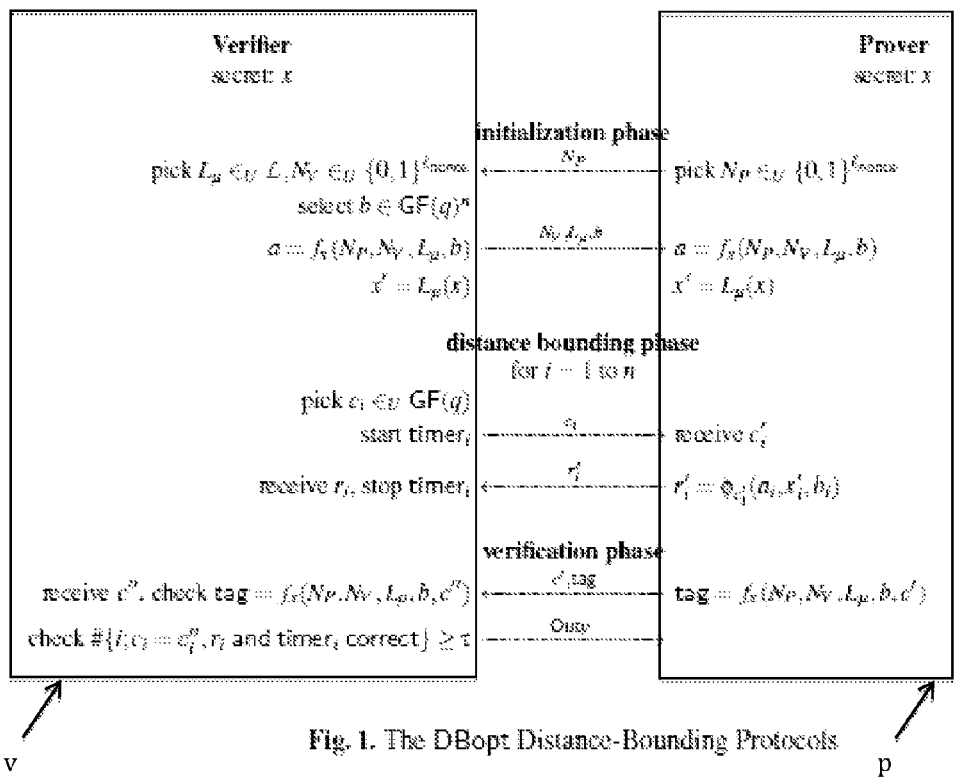
Fig. 1. The DBopt Distance-Bounding Protocols

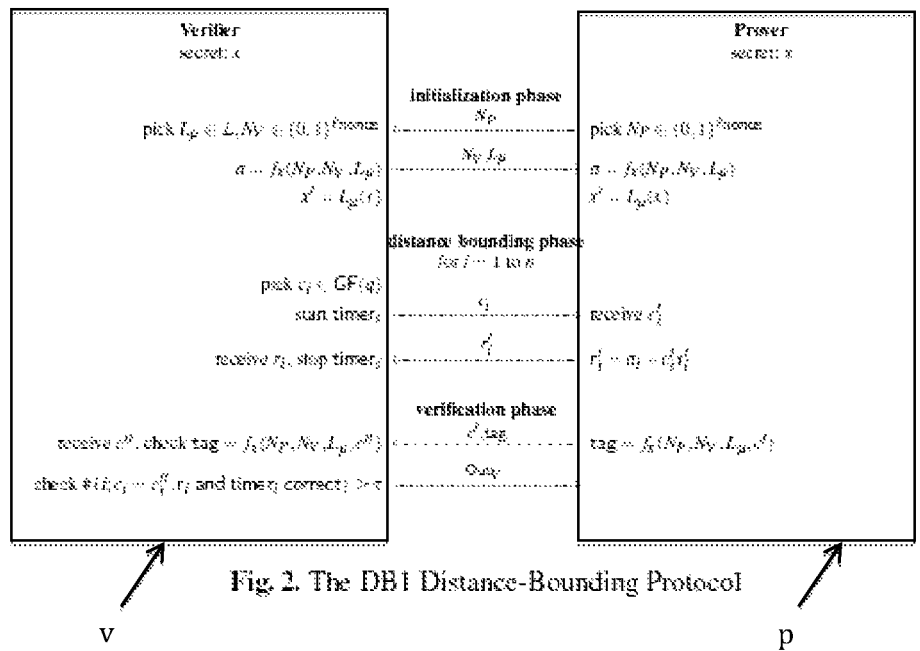
Fig. 2. The DB1 Distance-Bounding Protocol

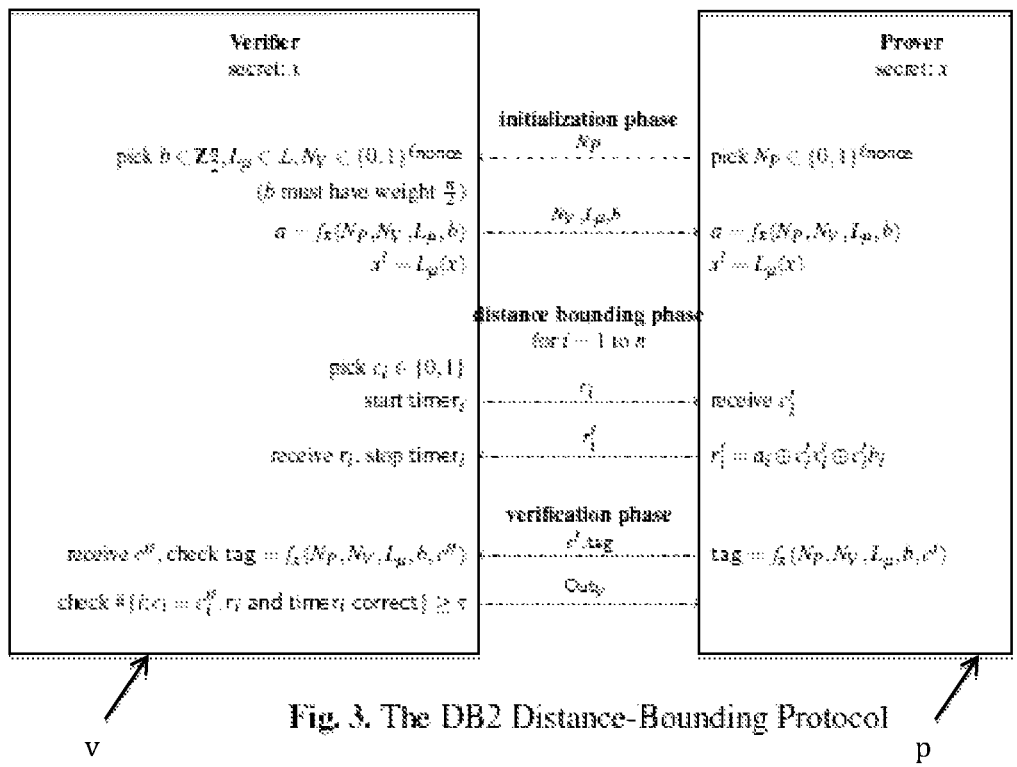
Fig. 3. The DB2 Distance-Bounding Protocol

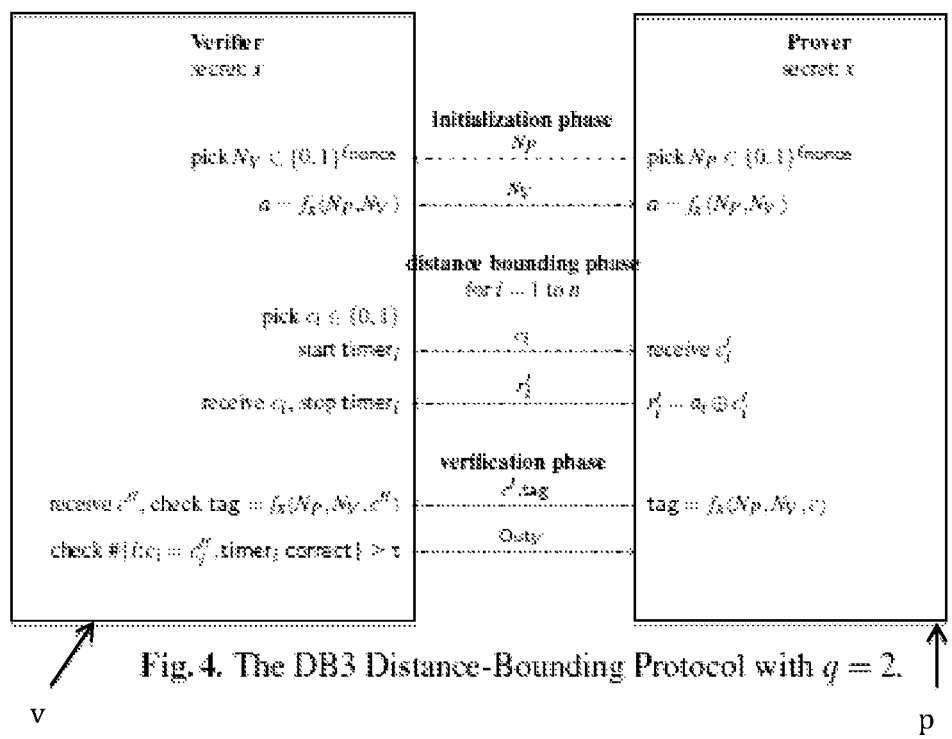
Fig. 4. The DB3 Distance-Bounding Protocol with $q = 2$.

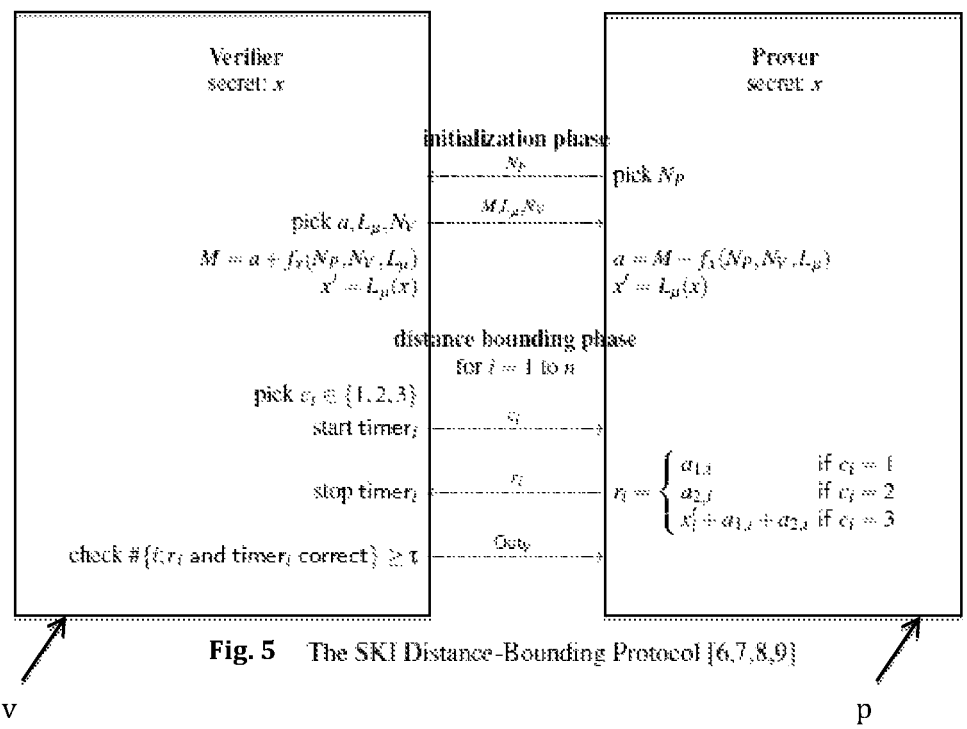
Fig. 5 The SKI Distance-Bounding Protocol [6,7,8,9]

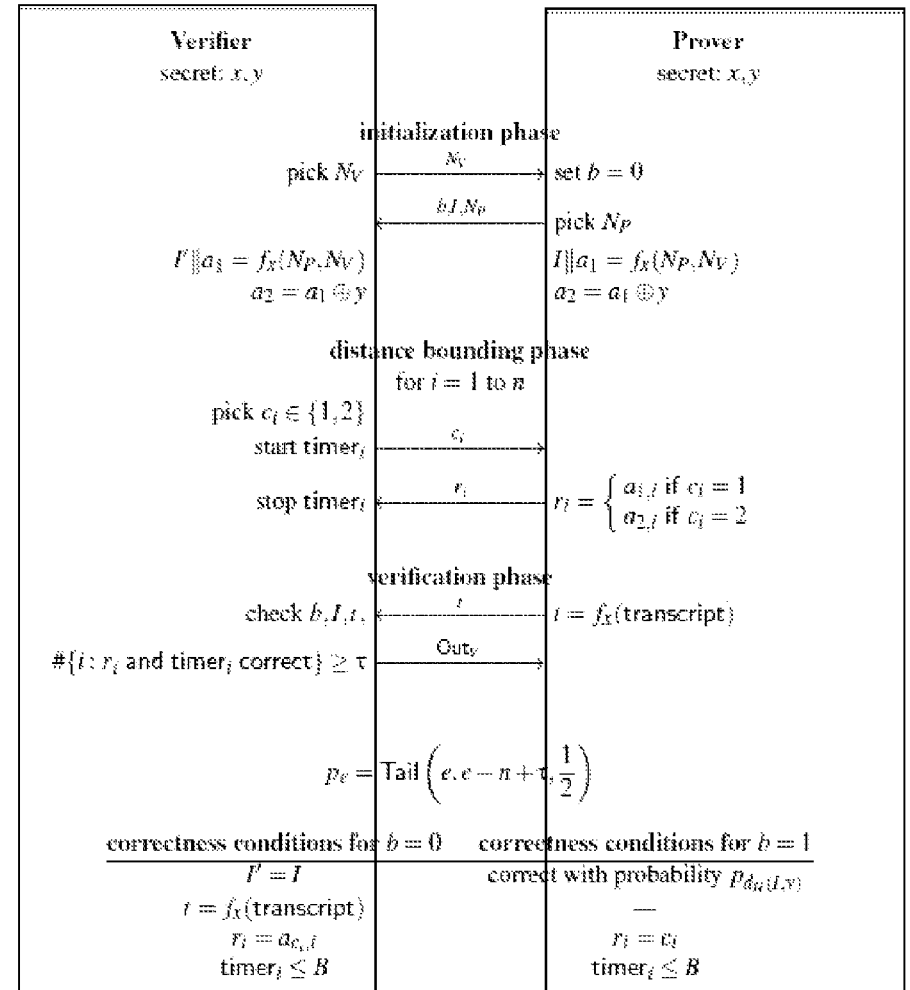
Fig. 6 The Fischlin-Onete (FO) distance-bounding protocol

METHOD AND DEVICE FOR PROVING HIS IDENTITY

The present application claims priority from U.S. provisional application U.S. 61/951,255 filed on Mar. 11, 2014, the entire contents of which is hereby incorporated by reference.

INTRODUCTION

The present invention is related to a distance bounding methods and to devices allowing a user to prove his identity and proximity to a verifier.

RELATED ART

Some important applications such as NFC-based payments or RFID access cards in our daily lives provide services according to the user's location. Relay attacks are serious threats against these applications. For instance, if someone make payment with a card on a malicious device then the device can relay to a fake card which is paying for something more expensive. As wireless technologies become more and more pervasive, being used daily in access control, remote unlocking credit-card payments and beyond, relay attacks also become a growing threat to the social acceptance of these techniques. It seems likely that nearly all wireless devices will eventually have to implement solutions to thwart these types of fraud.

To defeat relay attacks, Brands and Chaum introduced the notion of distance-bounding protocols in S. Brands, D. Chaum, "Distance-Bounding Protocols (Extended Abstract)", Advances in Cryptology EUROCRYPT '93, Lofthus, Norway, Lecture Notes in Computer Science 765, pp. 344-359, Springer-Verlag, 1994.

Distance bounding is a special problem of position-based cryptography, as described by Chandran et al. in N. Chandran, V. Goyal, R. Moriarty, R. Ostrovsky, "Position Based Cryptography", Advances in Cryptology CRYPTO '09, Santa Barbara, Calif., U.S.A., Lecture Notes in Computer Science 5677, pp. 391-407, Springer-Verlag, 2009.

Loana Boureanu and Serge Vaudenay describe an implementation in "Challenges in Distance-Bounding", Security & Privacy, IEEE, 2015/1, Volume 12, Band 1, pages 41-48.

These distance-bounding protocols rely on information being local and incapable of travelling faster than the speed of light. So, in distance-bounding, an RFID reader can assess when participants are close enough because the round-trip communication time must have been short enough. The whole idea of distance-bounding is that a prover, holding a key x, demonstrates that he is close to a verifier (who also knows this key x).

The literature on distance-bounding considers several threat models:

Distance fraud (DF): a far-away malicious prover tries to illicitly pass the protocol.

Mafia fraud (MF): a man-in-the-middle (MiM) adversary between a far-away honest prover and a verifier tries to exploit the prover's insights to make the verifier accept. (This generalizes relay attacks as not only does this adversary relay, but he may also modify the messages involved.). This attack is described in Y. Desmedt, "Major Security Problems with the "Unforgeable" (Feige-) Fiat-Shamir Proofs of Identity and How to Overcome Them", Congress on Computer and Communication Security and Protection Securicom '88, Paris, France, pp. 147-159, SEDEP Paris France, 1988.

Terrorist fraud (TF): a far-away malicious prover colludes with an adversary to make the verifier accept the adversary's rounds on behalf of this far-away prover, in such a way that the adversary gains no advantage to later pass the protocol on his own. This attack is described in the previously mentioned publication of Y. Desmedt.

Impersonation fraud: An adversary tries to impersonate the prover to the verifier. This attack is described in G. Avoine, A. Tchamkerten, "An Efficient Distance Bounding RFID Authentication Protocol: Balancing False-Acceptance Rate and Memory Requirement", In Information Security ISC '09, Pisa, Italy, Lecture Notes in ComputerScience 5735, pp. 250-261, Springer-Verlag, 2009.

Distance hijacking [15]: A far-away prover takes advantage of some honest, active provers (of which one is close) to make the verifier grant privileges for the far-away prover. This attack is described in C. J. F. Cremers, K. B. Rasmussen, B. Schmidt, S. Capkun, "Distance Hijacking Attacks on Distance Bounding Protocols", IEEE Symposium on Security and Privacy S&P '12, San Francisco, Calif., USA, pp. 113-127, IEEE Computer Society, 2012.

S. Vaudenay, "On Modeling Terrorist Frauds", In Provable Security ProvSec '13, Melaka, Malaysia, Lecture Notes in Computer Science 8209, pp. 1-20, Springer-Verlag, 2013.17, proposed a formal model of the attacks and protocols (herein called the BMV model) including the notion of time. A more complete model is described in Ioana Boureanu, Aikaterini Mitrokotsa, Serge Vaudenay, "Practical and provably secure distance-bounding", 2015, Journal of Computer Security, IOS Press, Available as IACR Eprint 2013/465 report, 2013, http://eprint.iacr.org/2013/465.pdf. Based on all these models, the paper factors all the previously enumerated common frauds into three possible threats:

Distance fraud. This is the classical notion, but concurrent runs with many participants is additionally considered. I.e., it includes other possible provers (with other secrets) and verifiers. Consequently, this generalized distance fraud also includes distance hijacking.

Man-in-the-middle. This formalization considers an adversary working in two phases. During a learning phase, this adversary can interact with many honest provers and verifiers. Then, the attack phase contains a far away honest prover of given ID and possibly many other honest provers and other verifiers. The goal of the adversary is to make the verifier accept the proof with ID. Clearly, this generalizes mafia fraud (capturing relay attacks) and includes impersonation fraud.

Collusion fraud. This formalization considers a far-away prover holding x who helps an adversary to make the verifier accept. This might be in the presence of many other honest participants. However, there should be no man-in-the-middle attack stemming from this malicious prover. I.e., one should not extract from this prover any advantage to (later) run a man-in-the-middle attack.

In S. Vaudenay, "On Modeling Terrorist Frauds", Provable Security ProvSec '13, Melaka, Malaysia, Lecture Notes in Computer Science 8209, pp. 1-20, Springer-Verlag, 2013.17, the last threat model is replaced by a notion coming from interactive proofs:

Soundness. For all experiment with a verifier V, there exists an extractor such that the following holds: if this extractor is given as input several views of all participants which were close to V in several executions and which made him accept therein, then this extractor reconstructs the secret x. This was further shown to generalize collusion-fraud resistance.

There exist many distance-bounding protocols, but nearly all are broken in some way. For instance, the protocols from G. P. Hancke, M. G. Kuhn, "An RFID Distance Bounding Protocol" Conference on Security and Privacy for Emerging Areas in Communications Networks SecureComm '05, Athens, Greece, pp. 67-73, IEEE, 2005, as well as the protocol from C. H. Kim, G. Avoine, "RFID Distance Bounding Protocol with Mixed Challenges to Prevent Relay Attacks", Cryptology and Network Security, 8th International Conference CANS 2009, Kanazawa, Japan, Lecture Notes in Computer Science 5888, pp. 119-133, Springer-Verlag, 2009, or the protocol from V. Nikov, M. Vauclair, "Yet Another Secure Distance-Bounding Protocol", Proceedings of SECRYPT '08, Porto, Portugal, pp. 218-221, INSTICC Press, 2008, are vulnerable to Terrorist Fraud TF. Man-in-the-middle attacks are also effective against many distance-bounding protocols, for example if a man-in-the-middle is placed at an authorised distance from the verifier.

In particular, G. P. Hancke, "Distance Bounding for RFID: Effectiveness of Terrorist Fraud", Conference on RFID-Technologies and Applications RFID-TA '12, Nice, France, pp. 91-96, IEEE, 2012, observed that noisy-resilience in nearly all protocols allowed to mount a Terrorist Fraud Attack. This is also valid for the SwissKnife protocol described by C. H. Kim, G. Avoine, F. Koeune, F.-X. Standaert, O. Pereira. The Swiss-Knife RFID Distance Bounding Protocol. In Information Security and Cryptology ICISC '08, Seoul, Korea, Lecture Notes in Computer Science 5461, pp. 98-115, Springer-Verlag, 2009.

So, the problem of making provably secure distance bounding is of utmost importance.

We will now describe the SKI protocol and the Fischlin-Onete (FO) protocol of the prior art. Those two protocols provide an all-encompassing proven security, i.e., they protect against all the above threats.

The SKI Protocol

The SKI protocol is illustrated on FIG. 5. It is described in Boureanu, A. Mitrokotsa, S. Vaudenay, "Secure & Lightweight Distance-Bounding", Lightweight Cryptography for Security and Privacy LightSec '13, Gebze, Turkey, Lecture Notes in Computer Science 8162, pp. 97-113, Springer-Verlag, 2013; in I. Boureanu, A. Mitrokotsa, S. Vaudenay, "Practical & Provably Secure Distance-Bounding" available as IACR Eprint 2013/465 report, 2013. http://eprint.iacr.org/2013/465.pdf; in I. Boureanu, A. Mitrokotsa, S. Vaudenay, "Towards Secure Distance Bounding", "Fast Software Encryption 13", Singapore, Lecture Notes in Computer Science 8424, pp. 55-67, Springer-Verlag, 2013, among others.

In the SKI protocol, a secret $x \in \{0,1\}^s$ is considered, given a security parameter s. The secret is shared between the prover p and the verifier v. The function f must be a PRF with circular-PRF security. It uses some other parameters based on s: the number of rounds n, a threshold $\tau$, and the nonce length $l_{nonce}$.

Given a vector $\mu$, the linear function $L_\mu$ is defined by $$L_\mu(x) = (\mu \cdot x, \ldots, \mu \cdot x)$$

Namely, all bits are set to the dot product between $\mu$ and x. With $x' = L_\mu(x)$, Hancke's terrorist fraud [20] would reveal a majority of the bits of x' thus leaking $L_\mu(x)$. Since $L_\mu$ is not chosen by the prover p, by repeating the attack, we can collect enough information about x to reconstruct x. So, Hancke's terrorist fraud is prevented.

There exists several variants of SKI with different properties. Namely, secret sharing schemes other than the one in FIG. 7 can be considered. Other leakage schemes $L_\mu$ can also be considered.

The FO Protocol

The FO protocol is described in M. Fischlin, C. Onete, "Terrorism in Distance Bounding: Modelling Terrorist-Fraud Resistance", Applied Cryptography and Network Security ACNS '13, Banff AB, Canada, Lecture Notes in Computer Science 7954, pp. 414-431, Springer-Verlag, 2013. It is also depicted The FO protocol is depicted on FIG. 6.

The protocol builds up on the Swiss-Knife protocol and uses a special escape strategy b=1. Normal users shall only use b=0. For b=1, the verifier expect a simple echo on challenges (i.e., $r_i = c_i$), does not verify the tag t, and has a probabilistic behavior: it accepts with probability $p_e$ where e is the Hamming distance between I and the secret y.

Theorem 19 DF-resistance of FO) The FO scheme $\alpha$-resists to distance frauds, for $$\alpha = \text{Tail}\left(w, \tau - n + w, \frac{1}{2}\right),$$

where w is the Hamming weight of y. On average over y, this is $$\alpha = \text{Tail}\left(n, \tau, \frac{3}{4}\right).$$

For $$\frac{\tau}{n} > \frac{3}{4} + cte,$$

this is negligible.

The FO protocol offers some form of terrorist-fraud, but, as the SKI protocol, requires a high number of rounds to be resistant.

BRIEF SUMMARY OF THE INVENTION

It is an aim of the present invention to provide another method for offering provably secure distance bounding.

It is another aim of the present invention to provide a method offering provably secure distance bounding which is more efficient, i.e., which requires less rounds and/or less data to be exchanged for offering the same reliability at a given level of noise.

According to the invention, these aims are achieved by means of a method allowing a prover (p) holding a secret key (x) to prove its identity to a verifier (v) and to prove to this verifier that he is within a predetermined distance of this verifier, said method comprising an initialization phase and a distance bounding phase, said initialization phase comprising the following steps:

the prover (p) picks a first nonce ($N_p$) and communicates this first nonce to the verifier;

the verifier (v) picks a first random vector (a), a leak function ($L_\mu$), and a second nonce ($N_v$);

the verifier uses said leak function ($L_\mu$) to compute a modified secret (x') depending on the leak ($L_\mu(x)$) of said secret (x);

the verifier transmits to said prover said leak function ($L_\mu$) and said second nonce ($N_v$);

the prover retrieves said first random vector (a) and said modified secret (x'), wherein said first random vector (a) and said modified secret (x') are used by said prover during said distance bounding phase for computing responses ($r_i$) to challenges ($c_i$) sent by said verifier to said prover.

This method is a distance-bounding (DB) protocol. It behaves like a traditional interactive proof system as it really is a proof of proximity. In particular, it satisfies: 1. completeness (i.e., an honest prover close to the verifier will certainly pass the protocol); 2. soundness (i.e., if the verifier accepts the protocol, then we could extract from close-by participants the information to define a successful prover); 3. security (i.e., no participant shall be able to extract some information from the honest prover to make the verifier accept).

The different parameters (nonces, vectors, etc) are not necessarily transmitted in clear form; they may be transformed or embedded in matrices or vectors.

For example, in one embodiment, the verifier may further compute a computed vector (M) as a function of said first vector (a), said first nonce ($N_p$), said second nonce ($N_v$), and said leak function ($L_\mu$), and transmit said computed vector (M) transmits to said prover. The prover then receives from said verifier the computed vector (M). The prover may use the computed vector to retrieve said random vector.

In a preferred embodiment, the method further comprises a challenge verification phase after said distance bounding phase, wherein said prover sends to said verifier during said verification phase a parameter (t) that depends on challenges ($c'_i$) received by said prover during said distance bounding phase, wherein said verifier uses said parameter (t) to determine during said verification phase whether the challenges ($c'_i$) received by said prover during said distance bounding phase correspond to the challenges ($c_i$) sent to said prover.

The challenges ($c_i$) may be non binary.

The method may comprise a step during said initialization phase during which said verifier picks a second random vector (b) with a Hamming weight of n/2, where n is the number of challenges sent during said distance bounding phase, wherein said modified secret (x') is the addition of the leak of said secret ($L_\mu(x)$) and of the second random vector (b);

wherein said verifier transmits said second random vector (b) to said prover.

The prover p may be a device or apparatus comprising software allowing him to prove its identity. For example, the prover may be embedded as a wireless smart card, or as a NFC device, or as an electronic access control device.

The verifier v may be a device or apparatus comprising software allowing him to verify a claimed identity and distance of a prover. For example, the verifier may be embedded as a computer, point-of-sale-equipment, server, smartphone etc.

As seen from a prover p, an embodiment of the method of the present invention comprises an initialization phase and a distance bounding phase, said initialization phase comprising the following steps:

the prover picks a first nonce ($N_p$) and communicates this first nonce to the verifier;

the prover receives from said verifier a leak function ($L_\mu$) and a second nonce ($N_v$);

the prover determines a first random vector (a) and a modified secret (x') based on the received the first nonce, on the second nonce, on the leak function, and on the secret key (X);

said prover uses said first random vector (a) and said modified secret (x') during a distance bounding phase for computing responses ($r_i$) to challenges ($c_i$) received from said verifier.

The method may further comprise a challenge verification phase after said distance bounding phase. The prover may send to said verifier during said verification phase a parameter (t) that depends on challenges ($c'_i$) received by said prover during said distance bounding phase.

As seen from a verifier v, an embodiment of the method of the present invention that can be used by a verifier holding a secret key (x) to verify the identity of a prover and whether this prover is within a predetermined distance of this prover may comprise an initialization phase and a distance bounding phase, said initialization phase comprising the following steps:

the verifier receives a first nonce ($N_p$) transmitted by a prover;

the verifier picks a first random vector (a), a leak function ($L_\mu$), and a second nonce ($N_v$);

the verifier uses said leak function ($L_\mu$) to compute a modified secret (x') depending on the leak ($L_\mu(x)$) of said secret (x);

the verifier transmits to said prover said leak function ($L_\mu$) and said second nonce ($N_v$);

the verifier send challenges ($c_i$) to said prover;

the verifier verifies a response ($r_i$) to said challenge received from said prover;

the verifier verifies the delay ($t_i$) between a challenge and a response ($r_i$) to said challenge.

The method may further comprise a challenge verification phase after said distance bounding phase, wherein said receiver receives from said verifier during said verification phase a parameter (t) that depends on challenges ($c'_i$) received by said prover during said distance bounding phase, wherein said verifier uses said parameter (t) to determine during said verification phase whether the challenges ($c'_i$) received by said prover during said distance bounding phase correspond to the challenges ($c_i$) sent to said prover.

The method may further comprise a step during said initialization phase during which said verifier picks a second random vector (b) with a Hamming weight of n/2 where n is the number of challenges sent during said distance bounding phase, wherein said modified secret (x') further depends on said second random vector (b);

wherein said verifier transmits said second random vector (b) to said prover.

In one aspect, the invention is also related to an electronic device which could be used as prover and comprising:

a storage for holding a secret key (x)

means for picking a first nonce ($N_p$) and for communicating this first nonce to a verifier;

means for receiving from said verifier a leak function ($L_\mu$) and a second nonce ($N_v$);

means for retrieving a first random vector (a) and a modified secret (x') based on the first nonce, on the second nonce, on the leak function, and on the secret key (X); means for receiving from said verifier a sequence of challenges ($c_i$);

means for determining responses ($r_i$) to said challenges based on said first nonce (a) and on said modified secret ($x'_i$).

The device p may further comprise means for computing and transmitting to said verifier during a verification phase a parameter (t) that depends on challenges ($c'_i$) received by said prover during said distance bounding phase.

The device p may be a smart card, a NFC device or an electronic access control device.

According to one aspect, the invention is related to an electronic device v which could be used as verifier and comprising:

means for receiving a first nonce from a verifier;

means for picking a first random vector (a), a leak function ($L_\mu$), and a second nonce ($N_v$);

means using said leak function ($L_\mu$) to compute a modified secret (x') depending on the leak ($L_\mu(x)$) of said secret (x);

means for transmitting to said prover said leak function ($L_\mu$) and said second nonce ($N_v$);

means for sending challenges ($c_i$) to said prover;

means for verifying responses ($r_i$) to said challenges from said prover;

means for verifying a delay ($t_i$) between a challenge and a corresponding response ($r_i$) received from the prover.

The device of may further comprise means using a parameter (t) received from said prover to determine during a verification phase whether the challenges ($c'_i$) received by said prover during said distance bounding phase correspond to the challenges ($c_i$) sent to said prover.

The device may further comprising means for picking a second random vector (b) with a Hamming weight of n/2 where n is the number of challenges sent during said distance bounding phase, wherein said modified secret (x') is the addition of the leak of said secret ($L_\mu(x)$) and of the second random vector (b);

wherein said verifier transmits said second random vector (b) to said prover.

According to one aspect, the invention is also related to a system comprising a device p that can be used as a prover and a device v that can be used as a verifier.

According to one aspect, the invention is also related to a tangible computer-program product comprising a computer-readable medium comprising codes executable by at least one processing circuit for causing said processing circuit to carry out the above described method.

BRIEF DESCRIPTION OF THE DRAWINGS

The invention will be better understood with the aid of the description of an embodiment given by way of example and illustrated by the figures, in which:

FIG. 1 illustrates the DBopt bounding protocol;

FIG. 2 illustrates the DB1 bounding protocol;

FIG. 3 illustrates the DB2 bounding protocol;

FIG. 4 illustrates the DBopt bounding protocol.

FIG. 5 illustrates the SKI protocol of the prior art.

FIG. 6 illustrates the FO protocol of the prior art.

DETAILED DESCRIPTION OF POSSIBLE EMBODIMENTS OF THE INVENTION

For our security proofs, we will now first introduce a new complete set of security definitions for distance-bounding, capturing the previous notions, but being in line with the established theory behind interactive proofs. In particular, we will revisit the definition of mafia fraud/man-in-the-middle and the definition of terrorist fraud/collusion fraud.

Useful Bounds for Noisy Communications

To assert security in noisy communications, we will make use of the tail of the binomial distribution:

$$\text{Tail}(n \cdot \tau \cdot \rho) = \sum_{i=\tau}^{n} \binom{n}{i} \rho^i (1-\rho)^{n-i}.$$

For any $\epsilon$, n, $\tau$, $\rho$ such that $$\frac{\tau}{n} < \rho - \varepsilon,$$

we have $\text{Tail}(n, \tau, \rho) < 1 - e^{-2\epsilon^2 n}$. For $$\frac{\tau}{n} > \rho - \varepsilon,$$

we have $\text{Tail}(n, \tau, \rho) < e^{-2\epsilon^2 n}$.

Revised DB Security Model and Proofs we now refine the security definitions and other tools from the above described BMV security model. In this section, we also discuss the links with the original notions.

In this example, we concentrate on distance-bounding protocols based on symmetric cryptography (which is the overwhelmingly prevalent approach in DB. The method could also be applied to public-key distance-bounding, using asymmetric cryptography.

Definition 1. A (symmetric) distance-bounding protocol is a tuple ($\mathcal{K}$,P,V,B), constructed of the following: a key domain $\mathcal{K}$; a two-party probabilistic polynomial-time (PPT) protocol (P(x),V(x)), where P is the proving algorithm, V is the verifying algorithm, and x is taken from $\mathcal{K}$; a distance bound B. At the end of the protocol, the verifier V(x) sends a final message $\text{Out}_V$. This output denotes that the verifier accepts ($\text{Out}_V=1$) or ($\text{Out}_V=0$).

In a DB protocol, apart from the participants prover and verifier, there may exist adversaries. Each participant has instances and each instance has its own location. P denotes the set of instances of the prover, V denotes the set of the instances of the verifier and A denotes the set of the instances of the other participants.

Informally, a distance-bounding protocol is complete if executing $P(x) \leftrightarrow V(x)$ on locations within a distance bounded by B makes V(x) accept with overwhelming probability. The formalism is straightforward with the settings below.

We can compare the protocols of the invention to any DB protocol that follows what we call the common structure.

Definition 2. (Common structure) A DB protocol with the common structure based on parameters (n, $\tau$, $\text{num}_c$, $\text{num}_r$) has some initialization and verification phases which do not depend on communication times. The verification phase can be interactive or not. These phases are separated by n rounds of timed challenge/response exchanges. This is called the distance bounding phase. A response is on time if the elapsed time between sending the challenge and receiving the response is at most 2B. Provers don't measure time Provers have no clock. They are in a waiting state to receive the challenge. Challenges and responses are in sets of cardinality $\text{num}_c$ and $\text{num}_r$, respectively.

When the protocol follows the specified algorithms but messages during the distance bounding phase can be corrupted during transmission, we say that the protocol is τ-complete if the verifier accepts if and only if at least τ rounds have a correct and on-time response.

One can easily see that nearly all distance-bounding protocols in the literature fit this definition.

In practice, when the timed phase is subject to noise, we assume that there is a probability of $p_{noise}$ that one round of challenge/response is corrupted. The probability that an honest prover, close to the verifier, passes the protocol is thus Tail(n, τ, 1−$P_{noise}$). So, with $$\frac{\tau}{n} < 1 - p_{noise}$$

with a constant gap, the probability to fail is negligible, due to the Chernoff-Hoeffding bound.

Participants, Instances, Setup and Locations.

In a DB protocol, participants can be a prover p, a verifier v, or adversaries. The prover and the verifier receive a key x which is randomly selected from the key space. We adopt a static adversarial model: i.e., at the beginning of the experiment, it is decided whether the prover is malicious or not. Participants have several instances. An instance has a location. It corresponds to the execution of a protocol during one session.

A honest prover runs instances of the algorithm P denoted by P(x). An instance of a malicious prover runs an arbitrary algorithm denoted by P*(x). P denotes the set of instances of the prover.

The verifier is honest without loss of generality (A "malicious verifier" running an algorithm V*(x) can be seen as a malicious prover running V*(x)). He runs instances of the algorithm V denoted by V(x). V denotes the set of instances of the verifier.

Other participants are (without loss of generality) malicious and may run whatever algorithm, but with no initialized key. The set of such malicious participants is denoted A. By contrast, a designated, one such instance is denoted $\mathcal{A}$.

Locations are elements of a metric space.

Why a Single Identity?

We will use a definition using a single identity, without loss of generality. This is because provers or verifiers running the protocol with other identities (and keys independent of x) could be considered as elements of A.

Definition 3. (DB Experiment) An experiment exp for a distance-bounding protocol ($\mathcal{H}$, P, V, B) is a setting (P, V, A) with several instances of participants, at some locations, set up as above, and running an overall PPT sequence.

In the above definition, the notion of experiment implies simultaneously several different entities: participants, physical locations, algorithms to be run by these participants and corruption states. As such, when used inside further definitions, the notion of experiment will implicitly or explicitly, upon the case, quantify over these entities.

We further assume that communicating from a location to another takes time equal to the distance. Indeed, no one can violate the fact that communication is limited by the speed of light. Adversaries can intercept some messages and replace them by others, but must adhere to the fact that computation is local.

Therefore, it could be accepted as a Lemma that a close-by participant cannot get online help from far away to answer correctly and in time to the challenge c.

Definition 5 Distinguished Experiment We denote by exp($\mathcal{V}$) an experiment in which we fix a verifier instance $\mathcal{V}$=V(x) from V, which we call distinguished verifier. Participants which are within a distance of at most B from a distinguished verifier $\mathcal{V}$ are called close by participants. Others are called far-away participants.

Participants can move during the experiment, but not faster than the transmission of information. For simplicity, we assume that far-away participants remain far away during the experiment.

Definition 6 (α-resistance to distance fraud) We say that a distance-bounding protocol α-resists to distance fraud if for any distinguished experiment exp($\mathcal{V}$) where there is no participant close to $\mathcal{V}$, the probability that $\mathcal{V}$ accepts is bounded by α.

This definition is simplified and does not capture the notion of distance hijacking; therein, a far-away malicious P*(x) can make $\mathcal{V}$ accept by taking advantage of several honest provers which do not hold x but are close to $\mathcal{V}$. Nonetheless, distance hijacking and other extensions of classical frauds will be captured by the notion of soundness, which we introduce below.

Theorem 7. A DB protocol following the common structure with parameters (n, τ, $num_c$, $num_r$) cannot α-resist to distance fraud for α lower than $$\text{Tail}\left(n, \tau, \max\left(\frac{1}{num_c}, \frac{1}{num_r}\right)\right).$$

Proof. We construct a DF following the early-reply strategy: a malicious prover guesses with probability $$\frac{1}{num_c}$$

the challenge $c_i$ before it is emitted, and then he sends the response so that it arrives on time. The rest of the protocol is correctly simulated (with delay) after receiving the challenges. An incorrect guess would look like a round which was the victim of noise. So, the attack succeeds with probability $$\text{Tail}\left(n, \tau, \frac{1}{num_c}\right).$$

We can have a similar attack guessing the response r and succeeding with probability $$\text{Tail}\left(n, \tau, \frac{1}{num_r}\right).$$

While the above definition protects verifiers against malicious provers, we need an extra notion to protect the honest prover against men-in-the-middle. This is as follows.

Definition 8 (β-secure distance-bounding protocol) We say that a distance-bounding protocol is if for any distinguished experiment $\exp(\mathcal{V})$ where the prover is honest, and the prover instances are all far-away from $\mathcal{V}$, the probability that $\mathcal{V}$ accepts is bounded by $\beta$.

This definition formalizes security without a learning phase.

Intuitively, this notion protects honest provers from identity theft. It implies that x cannot be extracted by a malicious participant; this is along the same lines as in zero-knowledge interactive protocols. This notion of security also captures resistance to relay attacks, mafia fraud, and man-in-the-middle attacks. The advantage of Def. 8 over the resistance to man-in-the-middle attacks, as it was defined in [7, 9, Def. 4], is that we no longer need to formalize a learning phase, although we can easily show we capture these notions as well. Our definition is therefore simpler.

Theorem 9. A DB protocol following the common structure with parameters (n, $\tau$, $num_c$, $num_r$) cannot be $\beta$-secure for $\beta$ lower than $$\text{Tail}\left(n, \tau, \max\left(\frac{1}{num_c}, \frac{1}{num_r}\right)\right) \cdot 1$$

Proof. We consider $\mathcal{V}$ and a far-away instance of the prover P, and a close-by MiM $\mathcal{V}$. In the initialization phase and the verification phase, $\mathcal{V}$ passively relays messages between $\mathcal{V}$ and P. During the challenge phase, and in the pre-ask strategy, $\mathcal{V}$ guesses the challenge before it is released and asks for the response to P on time so that he can later on answer to $\mathcal{V}$. Clearly, the attack succeeds with probability

[1] Same remark about [33] as in Th. 7.

$$\text{Tail}\left(n, \tau, \frac{1}{num_c}\right).$$

We can have a similar attack with a post-ask strategy where $\mathcal{V}$ guesses the response at the same time he forwards the challenge to P. This succeeds with probability $$\text{Tail}\left(n, \tau, \frac{1}{num_r}\right).$$

Definition 10 (($\gamma$, $\gamma'$, m)-soundnes) We say that a distance-bounding protocol is ($\gamma$, $\gamma'$, m)-sound if for any distinguished experiment $\exp(\mathcal{V})$ in which $\mathcal{V}$ accepts with probability at least $\gamma$, there exists a PPT algorithm $\epsilon$ called extractor, with the following property. By $\epsilon$ running experiment $\exp(\mathcal{V})$ several times, in some executions denoted $\exp_i(\mathcal{V})$, i=1, . . . , M, for M of expected value bounded by m, we have that $Pr[\text{Out}_V=1: \mathcal{L}(\text{View}_1 \ldots \text{View}_M) \leftrightarrow V|\text{Succ}_1 \ldots \text{Succ}_M] \geq \gamma$.

where $\text{View}_i$ denotes the view of all close-by participants (except $\mathcal{V}$) and the transcript seen by $\mathcal{V}$ in the run $\exp_i(\mathcal{V}')$, and $\text{Succ}_i$ is the event that $\mathcal{V}$ accepts in the run $\exp_i(\mathcal{V})$.

Thus, in this approach, distance fraud does not capture distance hijacking anymore, distance hijacking being now captured by soundness. This makes proofs simpler. To this end, we extend the definition of soundness in such a way that the extraction of the secret is no longer necessary.

In other words, the extractor impersonates the prover to $\mathcal{V}$. In more details, this means that having $\mathcal{V}$ accept in run $\exp_i(\mathcal{V})$ implies the following: a piece of x was given to the close-by participants and it is stored in $\text{View}_i$, and that m such independent pieces, on average, could allow $\epsilon$ to impersonate P(x) to $\mathcal{V}$. This notion is pretty strong as it could offer a guaranty against distance hijacking: a prover making such attack would implicitly leak his credentials.

New Highly Efficient, Symmetric Distance-Bounding Protocols

We will now describe as non limitative examples three distance-bounding protocols or methods, called DBopt. It includes DB1, DB2, and DB3. Those embodiments of the invention are build up on the above described SKI and FO but outperform both the SKI and the FO protocols.

For instance, to offer a false acceptance rate of under 1 and false rejection rate of under 1%, at a noise level of 5% during the rapid bit-exchange, DB1 (with parameter q=3) requires 14/14/54 rounds for resistance to distance fraud/mafia fraud/terrorist fraud, respectively. For the same performance, SKI and FO require 84/48/181 and 84/84/? rounds, respectively. So, DB1 represents a substantial improvement in terms of efficiency, whilst maintaining provable security.

When considering optimality amongst protocols requiring at least $\tau$ out of n correct rounds, no clock for the prover p, and a challenge/response set of size q, we show security as follows:

|  | DF-resistance | MF-resistance | TF-resistance |
| --- | --- | --- | --- |
| DB1 (q > 2) | secure, optimal | secure, optimal | secure |
| DB2 (q = 2) | secure, suboptimal | secure, optimal | secure |
| DB3 (q = 2) | secure, optimal | secure, optimal | insecure |

Indeed, we will see herein that DB1 is in fact optimal in terms of distance-fraud resistance and security with non-binary challenges. The DB2 and DB3 variants are motivated by the use of binary challenges, which is customary in distance-bounding designs. Whilst DB2 is suboptimal, it still performs well, almost always, i.e., better than SKI and FO. DB3 is optimal but not TF-resistant.

DBopt

The DBopt protocol is illustrated on FIG. 1.

We use a security parameter s (the length of the secret x, i.e., $x \in K = Z_2^s$) and the following parameters based on s: the number of rounds n, the length $l_{tag}$ of tag, a threshold $\tau$, the nonce length $l_{nonce}$, and a constant q which is a prime power, e.g., q=2, q=3, or q=4. DBopt follows the common structure with parameters n, $\tau$, and $num_c = num_r = q$.

We assume $L_\mu(x) = (\mu(x), \ldots, \mu(x))$ for some function x $\mapsto \mu(x)$, but $\mu$ is not necessarily linear. Concretely, $\mu$ is a vector in $Z_2^s$ and map a fixed injection from $Z_2$ to GF(q). Hence, $\mu(x) = \text{map}(\mu \cdot x)$ maps a bitstring x to a GF(q)-representation of the bit obtained by the scalar product $\mu \cdot x$. We let $\mathcal{L}$ denote the set of all such possible $L_\mu$ mappings (map being fixed). The function $f_x$ maps to different codomains, depending on its inputs: given two nonces $N_P$ and $N_V$, $L_\mu \in \mathcal{L}$, and b, c$\in$GF(q)$^n$, $f_x(N_P, N_V, L_\mu, b) \in$ GF(q)$^n$ and $f_x(N_P, N_V, L_\mu, b, c) \in$ GF(q)$^{l_{tag}}$.

During the initialization, the prover p and the verifier v exchange some nonces $N_P$, $N_V$, some $L_\mu \in \mathcal{L}$, and a vector b.

The vector b could be fixed in the protocol, but is subject to some constraints as detailed below. V and P compute $a=f_x(N_P, N_V, L_\mu, b)$ and $x'=L_\mu(x)$. In the distance bounding phase, the response function is a linear function $r_i=\varphi_{c_i}(a_i, x'_i, b_i)$ defined by the challenge $c_i$. The verification checks that the participants have seen the same challenges (based on the tag computed by $tag=f_x(N_P, N_V, L_\mu, b, c)$), counts the number of rounds with a correct and timely response, and accepts if there are at least $\tau$ of them.

Clearly, the DBopt family is quite open to specific choices for q, map, b, and $\varphi_c$. We propose the instances DB1, DB2, and DB3. There are some specificities in each protocol which are summarized in the following table:

| protocoL | q | map | b | $\varphi_{c_i}$ |
|---|---|---|---|---|
| DB1 | (q > 2) | map(u) ≠ 0 | No b used | $\varphi_{c_i}(a_i, x'_i, b_i) = a_i + c_i x'_i$ |
| DB2 | (q = 2) | map(u) = u | secure, optimal | $\varphi_{c_i}(a_i, x'_i, b_i) = a_i + c_i x'_i + c_i b_i$ |
| DB3 | (q ≥ 2) | No map used | secure, optimal | $\varphi_{c_i}(a_i, x'_i, b_i) = a_i + c_i b_i$ |

Other instances could be considered.

Specifically, DB3 is the simplest protocol and is optimal, but it offers no soundness. DB2 works with binary challenges and responses, but it is not optimal. DB1 is optimal but needs q≥3 since it requires that map is injective from $Z_2$ to $GF(q)^*$. These protocols are depicted on FIG. 2-4.

DB1 uses a security parameter s (the secret length) and the following parameters based on s: the number of rounds n, the bitlength n0 of the tag t, a threshold t, the nonce length k, and a constant q>2 which is a prime power, e.g. q=3 or q=4.

A set of parameters $L_\mu$, $N_v$, a is picked by the verifier v during an initialization or distance bounding phase. Similarly, a parameter $N_p$ is picked by the prover p during the initialization phase. Both share a secret x. During the distance bounding phase, a set of values ci (challenges) is picked by the verifier. A timer is started and used by the verifier for measuring the time needed to receive a response $r_i$ to a challenge $c_i$. A response is refused if it is not the expected one or if it received after a predetermined delay, corresponding to the predetermined distance bound.

As in SKI, we assume $L\mu(x)=(\mu(x); \_\_\_ ; \mu(x))$ for some function $\mu$, but we now assume that $\mu$ maps a secret x to an element of $GF(q)\_$. (We need at least two elements in this set, this is why we need q>2.)

Like in SKI, the leak vector x' is fundamental for soundness: the vector x' encodes $\mu \cdot x$, which leaks if the prover reveals his response function. The protocol DB1 adds a verification step, which allows to use better response functions: thanks to the above extra verification, the response function needs no longer resist men-in-the-middle playing with different challenges on the sides of P and V.

In one embodiment of the DB1, DB2 or DB3 protocol, the sending time of the challenges $c_i$ may be randomized, in order to prevent an attack by trying to guess replies and send them in advance. For example, each challenge ci may be sent at a random moment within a given interval of, for example, one microsecond.

The DB1 method thus includes an initialization phase comprising the following steps:

the prover p picks a first nonce ($N_p$) and communicates this first nonce to the verifier;

the verifier v picks a first random vector (a), a leak function ($L_\mu$), and a second nonce ($N_v$);

the verifier transmits to said prover said leak function ($L_\mu$), and said second nonce ($N_v$);

the verifier uses said leak function ($L_\mu$) to compute a modified secret (x') depending on the leak ($L_\mu(x)$) of said secret (x);

the prover retrieves said first random vector (a) and said modified secret (x').

During a distance bounding phase, the first random vector (a) and the modified secret (x') are used by the prover for computing a response ($r_i$) to each of the i challenges ($c_i$) sent by said verifier to said prover.

During a verification phase, the verifier verifies whether the reply $r_i$ to each of the i challenges $c_i$ correspond to this challenge, taking into account the first random vector a and the modified vector. The verifier also verifies if the delay timer$_i$ for receiving each reply is correct, i.e. under a predefined threshold. In a preferred embodiment, a value t is computed by the prover p as a function fx of $N_P$, $N_V$, $L_\mu$ and of the received vector c', and sent to the verifier; this value is compared with a value t computed on the verifier side. The prover is identified if t is correct and if all or at least a sufficient number of $r_i$ and $t_i$ are correct.

One particularity is that DB1 mandates $x'_i \neq 0$ so cannot accommodate q=2. If we want q=2, we need for DF-resistance to make sure that $r_i$ really depends on $c_i$, by introducing the vector b in which exactly half of the coordinates are 0. DB2 can be optimized into DB3 by using $r_i=a_i+c_i$ (so x' is unused and $b_i=1$ for all i) by sacrificing soundness.

DB1 is optimal in terms of distance-fraud resistance and security with non-binary challenges. A variant to DB1, called DB2, is illustrated on FIG. 3. This variant is motivated in following a trend in distance-bounding: that of using binary challenges. Whilst DB2 is not as efficient as DB1, it is performs well, almost always, better than SKI and FO.

DB2 still uses a security parameter s (the secret length) and the following parameters based on s: the number of rounds n, the bitlength n0 of the tag t, a threshold t, and the nonce length k. The function $\mu$ now maps $\{0;1\}^s$ to $\{0;1\}$. It is required that the random vector b in the DB2 protocol has a Hamming weight of n/2 to protect against distance fraud. The other setps are described and illustrated on FIG. 3.

In the DB1 to DB3 methods, the prover and the verifier are typically electronic devices or equipments. For example, the prover and the verifier could be any electronic equipment with a wireless interface for establishing a wireless communication with a wireless equipment in the vicinity.

The method of the present invention may be used to secure communications between various devices and equipments, including short distance communications between a prover p and a verifier v close to each other. For example, the method is suitable for securing communications over a distance of less than 10 meters, without limitation. The prover and verifier may communicate with each other via one or more wireless communication links that are based on or otherwise support any suitable wireless communication technology, including for example radio communication or optical communication.

For example, in some aspects the prover p and/or the verifier v may be associated within a network. In some aspects the network may comprise a body area network or a personal area network (e.g., an ultra-wideband network). In some aspects the network may comprise a local area network or a wide area network. A wireless device may support or otherwise use one or more of a variety of wireless communication technologies, protocols, or standards such as, for example, any RFID protocol, Bluetooth, NFC, Zigbee, WiMAX, and Wi-Fi. A wireless device may thus include appropriate components (e.g., air interfaces) to establish and communicate via one or more wireless communication links using the above or other wireless communication technologies.

Therefore, the communication between the prover and the verifier could be a wireless communication between two wireless equipments or devices.

DF-Resistance of DB1, DB2, and DB3

Theorem 11 (DF-resistance) The DBopt protocols α-resists to distance fraud for (DB1 and DB3)

$$\alpha = \text{Tail}\left(n, \tau, \frac{1}{q}\right)$$

which is negligible for $$\frac{\tau}{n} > \frac{1}{q} + cte;$$

(DB2)

$$\alpha = \text{Tail}\left(\frac{n}{2}, \tau - \frac{n}{2}, \frac{1}{2}\right)$$

which is negligible for $$\frac{\tau}{n} > \frac{3}{4} + cte.$$

Due to Th. 7, DB1 and DB3 are optimal for DF-resistance. DB2 is clearly not optimal (as DB3 is better with the same q=2). However, the bound is tight for DB2 as the DF guessing the response matches the α bound: the malicious prover always wins the rounds for which $x'=b_i$ (that is: exactly half of the rounds due to the Hamming weight of b) by sending the response in advance and passes with probability $$\alpha = \text{Tail}\left(\frac{n}{2}, \tau - \frac{n}{2}, \frac{1}{2}\right).$$

Proof. We consider a distinguished experiment $\exp(\mathcal{V})$ with no close-by participant. Due to the distance, the answer $r_i$ to $\mathcal{V}$ comes from far away. Thanks to Lemma 4, $r_i$ is independent from $c_i$. Since $c_i$ is randomly selected when it is sent, $r_i$ is statistically independent from $c_i$. For DB1, since $x'_i \neq 0$ by construction, $r_i$ equals $a_i + c_i x'_i$ with probability $$\frac{1}{q}.$$

The same goes for DB3. For DB2, thanks to the selection of b, this holds for exactly half of the rounds: those such that $x'_i + b_i \neq 0$. So, the probability to succeed in the experiment is bounded as stated.

Security of DB1, DB2, and DB3

We cannot rely on the PRF assumption alone for DB1 or DB2, since the secret is used as a key of $f_x$ and also outside $f_x$ in x'. The circular-PRF assumption guarantees the PRF-ness of f, even when we encrypt a function $L_\mu(x)$ of the key. We new recall and extend the notion, to accommodate DB1 and DB2.

Definition 12 (Circular PRF) We consider some parameters s, $n_1$, $n_2$, and q. Given $\mathcal{X} \in \{0,1\}^s$, a function L from $\{0,1\}^s$ to $GF(q)^{n_1}$, and a function F from $\{0,1\}^*$ to $GF(q)^{n_2}$, we define an oracle $\mathcal{O}_{\mathcal{X},F}$ by $\mathcal{O}_{\mathcal{X},F}(y,L,A,B) = A \cdot L(\mathcal{X}) + B \cdot F(y)$, using the dot product over $GF(q)$. We assume that L is taken from a set of functions with polynomially bounded representation. Let $(f_x)_{x \in \{0,1\}^s}$ be a family of functions from $\{0,1\}^*$ to $\{0,1\}^{n_2}$. We say that the family f is a (ε, T)-circular-PRF if for any distinguisher limited to a complexity T, the advantage for distinguishing $\mathcal{O}_{f_x}$, $x \in_u \{0,1\}^s$, from $\mathcal{O}_{\mathcal{X},F}$, $\mathcal{X} \in_u \{0,1\}^s$, where F is uniformly distributed, is bounded by ε. We require two conditions on the list of queries:

for any pair of queries (y,L,A,B) and (y',L',A',B'), if y=y', then L=L';

for any $y \in \{0,1\}$), if $(y, L, A_i, B_i)$, i=1, ... , l is the list of queries using this value y, then $$\forall \lambda_1, \ldots, \lambda_\ell \in GF(q) \sum_{i=1}^{\ell} \lambda_i B_i = 0 \Rightarrow \sum_{i=1}^{\ell} \lambda_i A_i = 0$$

over the $GF(q)$-vector space $GF(q)^{n_2}$ and $GF(q)^{n_1}$.

Theorem 13 (Security) The DBopt protocols are β-secure for (DB1 and DB2)

$$\beta = \text{Tail}\left(n, \tau, \frac{1}{q}\right) + \frac{r^2}{2} 2^{-\ell_{nonce}} + (r+1)\varepsilon + r 2^{-\ell_{tag}}$$

when f is a (ε, T)-circular-PRF (as defined by Def. 12]);
(DB3)

$$\beta = \text{Tail}\left(n, \tau, \frac{1}{q}\right) + \frac{r^2}{2} 2^{-\ell_{nonce}} + \varepsilon + 2^{-\ell_{tag}}$$

when f is a (ε, T)-PRF.

There, r is the number of honest instances (of P or V) and T is a complexity bound on the experiment. β is negligible for $$\frac{\tau}{n} > \frac{1}{q} + cte,$$

r and T polynomially bounded, and ε negligible.
Based on that $$\frac{r^2}{2} 2^{-\ell_{nonce}} + (r+1)\varepsilon + r 2^{-\ell_{tag}}$$

(or the similar term for DB3) can be made negligible against β, DB1, DB2, and DB3 are optimal for security due to Theorem 9.

Proof. We consider a distinguished experiment $\exp(\mathcal{V})$ with no close-by P(x), no P*(x), and where $\mathcal{V}$ accepts with probability p. We consider a game $\Gamma_0$ in which we simulate the execution of $\exp(\mathcal{V})$ and succeed if and only if $\text{Out}_\mathcal{V}$ by $\mathcal{V}$ is an acceptance message. $\Gamma_0$ succeeds with probability p.

First of all, we reduce to the same game $\Gamma_1$ whose success additionally requires that for every ($N_P$, $N_V$, $L_\mu$) triplet, there is no more than one instance P(x) and one instance V(x) using this triplet. Since P(x) is honest and selecting the $l_{nonce}$-bit nonce $N_P$ at random and the same for V(x) selecting $N_V$, by looking at the up to $r^2/2$ pairs of P(x)'s or of V(x)'s and the probability that one selection of a nonce repeats, this new game succeeds with probability at least $$p - \frac{r^2}{2} 2^{-\ell_{nonce}}.$$

Then, for DB1 and DB2, we outsource the computation of every $a_i + cx'_i$ to the oracle $$\mathcal{O}_{f_x}(y, L_\mu, A, B) = (A \cdot L_\mu(x)) + (B \cdot f_x(y))$$

as in Def. 12, with $y=(N_P, N_V, L_\mu, b)$, $A \cdot L_\mu(x) = c(L_\mu(x))_i$, and $B \cdot f_x(y) = (f_x(y))_i$. I.e., $A_i = c e_i$ and $B_i = e_i$, where $e_i$ is the vector having a 1 on its ith component and 0 elsewhere. This can be used with $c=c'_i$ by P(x) (for computing $r'_i$) or with $c=c_i$ by V(x) (for verifying $r_i$). Similarly, the computation (by P(x) or V(x)) of $\text{tag}=f_x(y)$ can be made by several calls of form $\mathcal{O}_{f_x}(y, L_\mu, 0, B)$. (We note that the y in this case has incompatible form with the y in the $r_i$ computation.) So, every computation requiring x is outsourced. Note that queries to the same y must use the same $L_\mu$ since this is part of y. So, the first condition in Def. 12 to apply the circular-PRF assumption is satisfied. We consider the event E that there exists in the game some sequence $(y, L_\mu, A_j, B_j)$ of queries to $\mathcal{O}_{f_x}$ sharing the same $(y, L_\mu)$ and some $\lambda_j$'s such that $\Sigma_j \lambda_j B_j = 0$ and $\Sigma_j \lambda_j A_j = 0$. We need to restrict to the event $\neg$ E to apply Definition 12. We consider the event E' that one instance in V receives a valid tag which was not computed by the prover P (i.e., it was forged).

Let $c''_i$ be the value received by V(x) in the verification phase. We assume that V checks that tag is correct, $\text{timer}_i$ is correct, and $c_i = c''_i$, then queries $\mathcal{O}_{f_x}(y, L_\mu, c_i, e_i, e_i)$ only if these are correct. If E happens for some $(y, L_\mu)$, due to the property of $\Gamma_1$, each i has at most two queries. Since $B_j = e_i$, $\Sigma_j \lambda_j B_j = 0$ yields pairs of values j and j' such that $i_j = i_{j'} = i$, $A_j = c_i e_i$, $A_{j'} = c'_i e_i$, $B_j = B_{j'} = e_i$, and $\lambda_j + \lambda_{j'} = 0$. The event E implies that there exists one such pair such that $\lambda_j A_j + \lambda_{j'} A_{j'} \neq 0$. So, $c_i \neq c'_i$. But since V only queries if $c''_i$ and tag are correct, we have $c_i = c''_i \neq c'_i$ and tag correct. So, $\mathcal{V}$ must have accepted some tag which was not computed by P(x). So, E implies E'. We now show that Pr[E'] is negligible.

We define $\Gamma_2$, the variant of $\Gamma_1$, which in turn requires that E' does not occur as an extra condition for success. We let $E'_j$ be the event that $\text{tag}_j$, the jth value tag received by any V(x) in V is forged. Let $\Gamma_{1,j}$ be the hybrid of $\Gamma_1$ stopping right after $\text{tag}_j$ is received and succeeding if $E'_j$ occurs but not $E'_1, \ldots, E'_{j-1}$.

Clearly, since $E'_1 \cup \ldots \cup E'_{j-1}$ does not occur and we stop right after reception of $\text{tag}_j$, E cannot occur. (Remember that for E to occur for the first time upon a query to $\mathcal{O}_{f_x}$, there must be a prior tag which was forged.) So, the conditions to apply the circular-PRF security reduction in Def. 12 is satisfied in $\Gamma_{1,j}$. We apply the circular-PRF assumption and replace $\mathcal{O}_{f_x}$ by $\mathcal{O}_{x,F}$, loosing some probability $\epsilon$. We obtain a game $\Gamma_{2,j}$. Clearly, $\Gamma_{2,j}$ succeeds with probability bounded by $2^{-l_{tag}}$ because F is random. So, $\Pr_{\Gamma_{1,j}}[\text{success}] \leq \epsilon + 2^{-l_{tag}}$ in $\Gamma_{i,j}$.

So, Pr[E'] is bounded by the sum of all $\Pr_{\Gamma_{1,j}}[\text{success}]$, i.e. $\Pr_{\Gamma_1}[E'] \leq r\epsilon + r2^{-l_{tag}}$ since the number of hybrids is bounded by r. Hence, $$\Pr_{\Gamma_2}[\text{success}] \geq p - \frac{r^2}{2} 2^{-\ell_{nonce}} - r\epsilon - r2^{-\ell_{tag}}.$$

Now, in the whole game $\Gamma_2$ where E' does not occur, we replace $\mathcal{O}_{f_x}$ by $\mathcal{O}_{x,F}$ and obtain the simplified game $\Gamma_3$. We have $$\Pr_{\Gamma_3}[\text{success}] \geq p - \frac{r^2}{2} 2^{-\ell_{nonce}} - (r+1)\epsilon - r2^{-\ell_{tag}}.$$

It is now possible to analyze the protocol $\Gamma_3$. Thanks to Lemma 4, the response is computed based on information from P(x) (w in Lemma 4) which is independent (in the sense of Lemma 4) from the challenge. Either P(x) was queried with a challenge before, but this could only match the correct one with probability $$\frac{1}{q}$$

and the adversary would fail with tag otherwise. Or, P(x) leaked nothing about the response to this challenge, and the answer by the adversary can only be correct with probability $$\frac{1}{q}.$$

In any case, his answer is correct with probability $$\frac{1}{q}.$$

So, $\Gamma_3$ succeeds with probability up to $$\text{Tail}\left(n, \tau, \frac{1}{q}\right).$$

To sum up, we have $$p \leq \text{Tail}\left(n, \tau, \frac{1}{q}\right) + \frac{r^2}{2} 2^{-\ell_{nonce}} + (r+1)\epsilon + r2^{-\ell_{tag}}$$

for DB1 and DB2.
For DB3, we loose $$\frac{r^2}{2} 2^{-\ell_{nonce}}$$

from $\Gamma_0$ to $\Gamma_1$. In $\Gamma_1$, we apply the full PRF reduction and loose $\epsilon$ to obtain $\Gamma_2$ with a random function. We loose $2^{-l_{tag}}$ more to assume that tag received by V was not forged in some $\Gamma_3$. Then, it is easy to see that either the prover was queried before $c_i$ was known, but this will only succeed if $c_i$ was correctly guessed, or it was queries after, but this will only succeed if the answer $r_i$ was correctly guessed. So, $\Gamma_3$ succeeds with a probability bounded by $$\mathrm{Tail}\left(n, \tau, \frac{1}{q}\right).$$

(Note that DB3 is insecure without the authenticating tag: the man-in-the-middle can just run the DB phase with the prover, deduce a, then answer all challenges from the verifier.)

Soundness of DB1 and DB2

Theorem 14 (soundness of DB1) The DB1 scheme is ($\gamma$, $\gamma'$, s+2)-sound for any $$\gamma \geq \frac{q}{q-1}p_B$$

and $\gamma'$ such that $\gamma' = (1 - \gamma^{-1}P_B)^s$, where $p_B = \max_{a+b \leq n} p_B(a,b)$ and $$p_B(a, b) = \sum_{u+v \geq \tau - a} \binom{n-a-b}{u}\binom{b}{v}\left(1 - \frac{1}{q}\right)^{b+u-v}\left(\frac{1}{q}\right)^{n-a-b-u+v}$$

More precisely, any collusin fraud with a success probability $$\gamma \geq \frac{p_B}{1 - \frac{1}{q} - \varepsilon}$$

leaks one random ($\mu, \mu \cdot x$) pair with probability at least $$\frac{1}{q} + \varepsilon.$$

Assuming $p_B = p_B(0,0)$, this compares $\gamma$ to $$\frac{q}{q-1}\mathrm{Tail}\left(n, \tau, \frac{q-1}{q}\right).$$

For instance, for $\gamma = sp_B$ and $$\frac{\tau}{n} > \frac{q}{q-1} + cte,$$

$\gamma$ is negligible and $\gamma'$ is greater than a constant.

If we applied the same proof as for SKI from [30, Th. 14], we would not get such a good result. We would rather obtain $$\mathrm{Tail}\left(\frac{n}{2}, \tau - \frac{n}{2}, \frac{q-1}{q}\right).$$

So, our proof of Th-14 is substantially improved.

Proof. We consider a distinguished experiment $\exp(\mathcal{V})$ where $\mathcal{V}$ accepts with probability $p \geq \gamma$.

The verifier $\mathcal{V}$ has computed some a and x'. We apply Lemma 4. We let $\mathrm{Resp}_i(c)$ be the value of the response $r_i$ arriving to $\mathcal{V}$ when $c_i$ is replaced to c in the simulation. We show below that we can always compute $\mathrm{Resp}_i(c) - \mathrm{Resp}_i(c')$ for any (c,c') pair from a straightline simulation (i.e., without rewinding). Let $\mathrm{View}_i$ be the view of close-by participants $\mathcal{A}$ until the time before $c_i$ arrives, and $w_i$ be the extra information (independent from $c_i$, in the sense of Lemma 4) arriving from far-away. Due to Lemma 4, we have $\mathrm{Resp}_i(c) = \mathrm{Algo}(\mathrm{View}_i, c, w_i)$. So, we can easily compute $\mathrm{Resp}_i(c) - \mathrm{Resp}_i(c')$ without rewinding. The answer by a far-away participant is independent from $c_i$, so $\mathrm{Resp}_i(c) - \mathrm{Resp}_i(c') = 0$: we can compute $\mathrm{Resp}_i(c) - \mathrm{Resp}_i(c')$ as well.

We say that c is correct in the ith round if $\mathrm{Resp}_i(c) = a_i + cx'_i$. We let $C_i$ be the set of correct c's for the ith round. We let S be the set of all i's such that $c_i \in C_i$. Finally, we let R (resp. R') be the set of all i's for which $\#C_i = q$ (resp. $\#C_i \leq 1$). I.e., all c's are correct in the ith round for i∈R and at most one is correct for i∈R'.

By definition, the probability that $\#S \geq \tau$ is $p \geq \gamma$. We see that $$\frac{\mathrm{Resp}_i(c) - \mathrm{Resp}_i(c')}{c - c'} = x'_i$$

if i∈R, for any c≠c'. If the left-hand side leads to the same value $\xi_i$ for each c≠c', we say that the round i votes for $x'_i = \xi_i$. If the (c,c') pairs do not lead to the same value in GF(q), we say that the round i does not vote. So, we can always compute the vote $\xi_i$ from the views of close-by participants. The majority of the available $\mathrm{map}^{-1}(\xi_i)$ shall decode $\mu \cdot x$.

For DB1, we can prove that if the round i votes for some $\xi_i$ such that $\xi_i \neq x'_i$, then we must have i∈R'. Indeed, if round i votes for some $\xi_i$ and $\#C_i \geq 2$, it means that there exist two different challenges c and c' such that the responses $\mathrm{Resp}_i(c)$ and $\mathrm{Resp}_i(c')$ are correct. So, $\mathrm{Resp}_i(c) = a_i + cx'_i$ and $\mathrm{Resp}_i(c') = a_i + c'x'_i$. The vote $\xi_i$ is $$\frac{\mathrm{Resp}_i(c) - \mathrm{Resp}_i(c')}{c - c'}$$

which is thus equal to $x'_i$. So, an incorrect vote cannot have two correct challenges: it must be for i∈R'. The majority of the votes does not give $x'_i$ only when $\#R \leq \#R'$. So, we shall bound $\Pr[\#R \leq \#R']$.

Let I, I' ⊂ (1, . . . , n) such that $\#I \leq \#I'$ and I∩I' is empty. Let $p_B(a,b)$ be the probability that at least τ rounds succeed, when we know that a rounds succeed with probability 1, b rounds succeed with probability $$\frac{1}{q},$$

and the other succeed with probability $$1 - \frac{1}{q}.$$

We have $\Pr[\#S \geq \tau, R=I, R'=I'] = \Pr[\#S \geq \tau | R=I, R'=I']\Pr[R=I, R'=I']$ and $\Pr[\#S \geq \tau | R=I, R'=I'] \leq p_B(\#I, \#I') \leq p_B$ since we have #I correct rounds for sure and it remains to pick u correct challenges (out of at most q−1) among the $i \notin I \cup I'$ rounds, and v correct challenges (out of at most 1) among the $i \in I'$ rounds, for all u and v such that $u+v \geq \tau - \#I$. By summing over all choices for I and I', we obtain that $\Pr[\#S \geq \tau, \#R \leq \#R'] \leq p_B$. So, $\Pr[\#R > \#R' | \#S \geq \tau] \geq 1 - \gamma^{-1} p_B$. So, when the experiment succeeds, the extracting algorithm gets a random pair $(\mu, \mu \cdot x)$ with probability at least $1 - \gamma^{-1} p_B$. This is better than just guessing $\mu \cdot x$ when $$\gamma > \frac{q}{q-1} p_B.$$

We can do M many such accepting experiments, collect some $(\mu, \mu \cdot x)$ until we have s vector $\mu$ spanning $GF(q)^s$, and reconstruct x with probability at least $\gamma' = (1 - \gamma^{-1} p_B)^s$. The probability that m samples in $GF(q)^s$ do not generate this space is $p_m \leq q^{s-m}$ (the number of hyperplane, $q^s - 1$ times the probability that the m samples are all in this hyperplane, which is $q^{-1}$ to the power m). So, the expected M until we generate the space is bounded by $s + \Sigma_{m \geq s} q^{s-m} \leq s+2$. Hence, after at most s+2 iterations on average, we can recover x by solving a linear system. This defines the extractor.

We can also push the extraction further when $$1 - \gamma^{-1} p_B > \frac{1}{q}$$

by solving an instance of the Learning Parity with Noise problem (LPN), which would still be feasible by the practical parameters s.

Extraction can also work with a complexity overhead bounded by $\mathcal{O}(s^j)$ and a probability of at least $\gamma' = \text{Tail}(s, s-j, 1-\gamma^{-1} p_B)$, by finding at most J errors by exhaustive search or LPN solving algorithms.

The maximum $p_B = p_B(a, b)$ is always reached for a=b.

Below, we prove that the result is tight for DB1 using q=3. Whether this it tight for other q is an open question. Whether it is optimal for protocols following the common structure is also open.

DB1's Tightness of the Soundness Proof.

To show that the result is tight for DB1 with q=3, we mount a (non-leaking) terrorist fraud succeeding with probability $$\gamma = \text{Tail}\left(n, \tau, \frac{q-1}{q}\right):$$

let the malicious prover give to the adversary the tables for $c_i \mapsto r_i + e_i(c_i)$ for every round i. For each such i, randomly pick one entry for which $e_i(c_i)$ is a random nonzero value and let it be 0 for other, two entries. With such tables as a response function, the adversary passes the DB phase with probability $\gamma$. (Other phases are done by relaying messages.)

Since the verifier accepts with negligible probability $\gamma$, the adversary learns as much as if $\text{Out}_V$ was always set to 0.

For q=3 and each i, based on random $a_i \in GF(q)$, $x'_i \in GF(q)^*$, and $c \mapsto e_i(c)$ as distributed above, we can easily see that the distribution of the transmitted table is independent from $x'_i$: for $x'_i = 1$, the table of $c \mapsto a_i + cx'_i$ defined by a random $a_i$ is randomly picked from $$\begin{pmatrix} 0 & \ldots & 0 \\ 1 & \ldots & 1 \\ 2 & \ldots & 2 \end{pmatrix} \cdot \begin{pmatrix} 0 & \ldots & 1 \\ 1 & \ldots & 2 \\ 2 & \ldots & 0 \end{pmatrix} \cdot \begin{pmatrix} 0 & \ldots & 2 \\ 1 & \ldots & 0 \\ 2 & \ldots & 1 \end{pmatrix}.$$

When adding the random table $e_i(c)$, it becomes a uniformly distributed random table among those with an output set of cardinality 2. For $x'_i = 2$, the table of $a_i + cx'_i$ is randomly picked from $$\begin{pmatrix} 0 & \ldots & 0 \\ 1 & \ldots & 2 \\ 2 & \ldots & 1 \end{pmatrix} \cdot \begin{pmatrix} 0 & \ldots & 2 \\ 1 & \ldots & 1 \\ 2 & \ldots & 0 \end{pmatrix} \cdot \begin{pmatrix} 0 & \ldots & 1 \\ 1 & \ldots & 0 \\ 2 & \ldots & 2 \end{pmatrix}.$$

but adding $e_i(c)$ leads to the same distribution as for $x'_i = 1$. So, the above attack does not leak and is a valid terrorist fraud. Th. 14 essentially says that there is no valid terrorist fraud with a larger $\gamma$. So, the result is tight for DB1 with q=3.

The same proof technique leads to the following result for DB2.

Theorem 15 (thDB2sound) For $$\frac{\tau}{n} > \frac{3}{4},$$

the DB2 scheme is $(\gamma, \gamma', s+2)$-sound for any $$\gamma \geq 2\text{Tail}\left(\frac{n}{2}, \tau - \frac{n}{2}, \frac{1}{2}\right) \text{ and } \gamma' = \left(1 - \gamma^{-1}\text{Tail}\left(\frac{n}{2}, \tau - \frac{n}{2}, \frac{1}{2}\right)\right)^s.$$

Again, it is open whether this is optimal for a protocol with binary challenges. The bound is pretty tight for DB2: a malicious adversary could leak the $c_i \mapsto r_i$ tables for a random selection of half of the rounds, and leak the table with one bit flipped for the others. This will not leak $x'_i$ and will pass with probability $$\gamma = \text{Tail}\left(\frac{n}{2}, \tau - \frac{n}{2}, \frac{1}{2}\right).$$

Performance Comparisons

Tests with a noise level of $p_{noise} = 5\%$ have shown that the DB1, DB2 and DB3 protocols are more resistant than SKI and FO. Moreover, a lower number of rounds is required to attain such security.

We provided the provably secure symmetric protocols DB1, DB2, and DB3 which require fewer rounds than the only two existing, provably secure protocols, SKI and FO. Prior to this, we have revised the formal model for distance-bounding protocols in a way which is closer to (the state of the art of) interactive proofs. We also studied optimality of all provably secure DB protocols, existing and advanced herein.

Implementations

The prover and verifier of the present invention may be incorporated into (e.g., implemented within or performed by) a variety of apparatuses (e.g., devices). For example, one or more aspects taught herein may be incorporated into a phone (e.g., a cellular phone), a computer, a tablet, a personal data assistant ("PDA"), a smart card, a RFID device or transponder, an electronic access key, a dongle, an entertainment device (e.g., a music or video device), a headset (e.g., headphones, an earpiece, etc.), a medical sensing device (e.g., a biometric sensor, a heart rate monitor, a pedometer, an EKG device, etc.), a user I/O device (e.g., a watch, a remote control, a light switch, a keyboard, a mouse, etc.), an environment sensing device (e.g., a tire pressure monitor), a computer, a point-of-sale device, an entertainment device, a hearing aid, a set-top box, or any other suitable device.

Those of skill would further appreciate that any of the various protocols, methods or method steps described or claimed in the present application may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative devices and further means described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Various electronic systems may be used by the verifier v as timer for verifying the delays $t_i$ between each challenge $c_i$ and the corresponding reply $r_i$. In one example, a time of flight measuring system based for example on avalanche diodes may be used.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes (e.g., executable by at least one processor) relating to one or more of the aspects of the disclosure.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the scope of the disclosure. Thus, the present disclosure is not intended to be limited to the aspects shown herein but is to be accorded the widest scope consistent with the principles and novel features disclosed herein.

The invention claimed is:

1. A computer implemented method using a hardware processor allowing a prover holding a secret key to prove its identity to a verifier and to prove to the verifier that the prover is within a predetermined distance of this verifier, said method comprising an initialization phase and a distance bounding phase, wherein during said distance bounding phase the verifier sends the prover at least one challenge, said initialization phase comprising the following steps:

the prover picks a first nonce and communicates the first nonce to the verifier; the verifier picks a first random vector, a leak function, and a second nonce, wherein the leak function is any function that could be used by an attacker to collect information about the secret key;

the verifier picks a second random vector with a Hamming weight of n/2, where n is a number of challenges sent during said distance bounding phase;

the verifier uses said leak function and said second random vector to compute a modified secret key as an addition of the leak function of said secret key and of the second random vector;

the verifier transmits, using the hardware processor via a network, to said prover said second random vector, said leak function and said second nonce;

the prover retrieves said first random vector and said modified secret key, wherein said first random vector and said modified secret key are used by said prover during said distance bounding phase for computing responses to challenges sent by said verifier to said prover so as to prove its identity and that said prover is within a predetermined distance of said verifier.

2. The method of claim 1, wherein the verifier computes a computed vector as a function of said first random vector, said first nonce, said second nonce, and said leak function; wherein the verifier transmits to said prover said computed vector, said leak function, and said second nonce; and wherein said prover uses said computed vector to retrieve said first random vector.

3. The method of claim 1, further comprising a challenge verification phase after said distance bounding phase, wherein said prover sends to said verifier during said verification phase a parameter (t) that depends on the challenges received by said prover during said distance bounding phase, wherein said verifier uses said parameter to determine during said verification phase whether the challenges received by said prover during said distance bounding phase correspond to the challenges sent to said prover.

4. The method of claim 3, wherein said challenges are non binary.

5. The method of claim 1, wherein each said challenge is sent at a random time within an interval.

6. The method of claim 1, wherein said prover is embedded as a wireless smart card.

7. The method of claim 1, wherein said prover is embedded as a NFC device.

8. The method of claim 1, wherein said prover is embedded as an electronic access control device.

9. A computer implemented method using a hardware processor used by a verifier holding a secret key for verifying the identity of a prover and for determining whether the prover is within a predetermined distance of the verifier, said method comprising an initialization phase and a distance bounding phase, wherein during said distance bounding phase the verifier sends the prover at least one challenge, said initialization phase comprising the following steps:
the verifier receives a first nonce transmitted by a prover;
the verifier picks a first random vector, a leak function, and a second nonce, wherein the leak function is any function that could be used by an attacker to collect information about the secret key;
the verifier picks a second random vector with a Hamming weight of n/2, where n is a number of challenges sent during said distance bounding phase;
the verifier uses said leak function and said second random vector to compute a modified secret key as an addition of the leak function of said secret key and of the second random vector; the verifier transmits, using the hardware processor via a network, to said prover said leak function and said second nonce;
the verifier sends challenges to said prover;
the verifier verifies a response to said challenge received from said prover;
the verifier verifies the delay between a challenge and a response to said challenge; and
wherein said verifier transmits said second random vector to said prover.

10. The method of claim 9, wherein the verifier computes a computed vector as a function of said first random vector, said first nonce, said second nonce, and said leak function; wherein the verifier transmits to said prover said computed vector, said leak function, and said second nonce.

11. The method of claim 9, further comprising a challenge verification phase after said distance bounding phase, wherein said receiver receives from said verifier during said verification phase a parameter that depends on the challenges received by said prover during said distance bounding phase,
wherein said verifier uses said parameter to determine during said verification phase whether the challenges received by said prover during said distance bounding phase correspond to the challenges sent to said prover.

12. The method of claim 11, wherein said challenges are non binary.

13. The method of claim 9, wherein each said challenge is sent at a random time within an interval.

14. An electronic device operable as a verifier and comprising:
a memory;
a hardware processor configured to:
receive a first nonce from a verifier;
pick a first random vector, a leak function, and a second nonce, wherein the leak function is any function that could be used by an attacker to collect information about a secret key;
use said leak function to compute a modified secret key depending on the leak function of said secret key;
transmit to said prover said leak function and said second nonce;
send challenges to said prover;
verify responses to said challenges from said prover;
verify a delay between a challenge and a corresponding response received from the prover; and
pick a second random vector with a Hamming weight of n/2 where n is the number of challenges sent, wherein said modified secret key is an addition of the leak function of said secret key and of the second random vector;
wherein said verifier transmits said second random vector to said prover.

15. The device of claim 14, further comprising:
means for using a parameter received from said prover to determine during a verification phase whether challenges received by said prover correspond to the challenges sent to said prover by the verifier.

16. The device of claim 14, wherein said challenges are non binary.

17. The device of claim 14, further comprising means for computing a computed vector as a function of said first random vector, said first nonce, said second nonce, and said leak function, and means for transmitting to said prover said computed vector, said leak function, and said second nonce.

18. A system comprising:
a device operable as a prover and a device operable as a verifier,
wherein the device operable as a prover comprises: a memory for holding a secret key;
a hardware processor configured to:
pick a first nonce and for communicating the first nonce to a verifier;
receive from said verifier a leak function, and a second nonce,
wherein the leak function is any function that could be used by an attacker to collect information about the secret key;
retrieve a first random vector and a modified secret based on the first nonce, on the second nonce, on the leak function, and on the secret key;
receive from said verifier a sequence of challenges; and
determine responses to said challenges based on said first nonce and on said modified secret; and wherein the device operable as a verifier comprises:
a hardware processor configured to:
receive a first nonce from a verifier;
pick a first random vector, a leak function, and a second nonce;
use said leak function to compute a modified secret key depending on the leak function of said secret key;
transmit to said prover said leak function and said second nonce;
send challenges to said prover;
verify responses to said challenges from said prover;
verify a delay between a challenge and a corresponding response received from the prover; and
pick a second random vector with a Hamming weight of n/2 where n is the number of challenges sent, wherein said modified secret key is an addition of the leak function of said secret key and of the second random vector;
wherein said verifier transmits said second random vector to said prover.

19. A computer-program product comprising a non-transitory computer-readable medium comprising codes executable by at least one processing circuit in a verifier for causing said processing circuit to carry out the steps of:

receiving a first nonce transmitted by a prover at the verifier;
picking a first random vector, a leak function, and a second nonce at the verifier, wherein the leak function is any function that could be used by an attacker to collect information about a secret key;
at the verifier, using said leak function to compute a modified secret key depending on the leak function of said secret key;
transmitting said leak function and said second nonce to said prover; sending challenges to said prover from said verifier;
verifying a response received from said prover to one of said challenges; verifying the delay between a challenge and a response to said challenge;
picking a second random vector with a Hamming weight of n/2 where n is the number of challenges sent during said distance bounding phase, wherein said modified secret key further depends on said second random vector; and
wherein said verifier transmits said second random vector to said prover.

* * * * *